United States Patent
Nefedov

(10) Patent No.: US 8,761,082 B2
(45) Date of Patent: Jun. 24, 2014

(54) APPARATUS, METHODS, AND COMPUTER PROGRAM PRODUCTS PROVIDING IMPROVED COMMUNICATION IN DECENTRALIZED WIRELESS NETWORKS

(75) Inventor: Nikolai Nefedov, Thalwil (CH)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 12/070,097

(22) Filed: Feb. 14, 2008

(65) Prior Publication Data

US 2009/0207894 A1 Aug. 20, 2009

(51) Int. Cl.
*H04B 7/212* (2006.01)
*H04B 7/26* (2006.01)
*H04B 1/7183* (2011.01)

(52) U.S. Cl.
CPC ............ *H04B 7/2662* (2013.01); *H04B 1/7183* (2013.01); *H04B 7/2678* (2013.01); *H04B 7/2696* (2013.01)
USPC ........................................................ 370/324

(58) Field of Classification Search
None
See application file for complete search history.

(56) References Cited

U.S. PATENT DOCUMENTS

| | | | | |
|---|---|---|---|---|
| 7,529,557 | B2 * | 5/2009 | Farrill ............................ | 455/518 |
| 2004/0202119 | A1 * | 10/2004 | Edge ............................... | 370/324 |
| 2005/0157658 | A1 * | 7/2005 | Ishii et al. ...................... | 370/252 |
| 2005/0185628 | A1 | 8/2005 | Watanabe et al. .............. | 370/347 |
| 2006/0084444 | A1 | 4/2006 | Kossi et al. .................... | 455/450 |
| 2008/0112427 | A1 * | 5/2008 | Seidel et al. ................... | 370/433 |
| 2008/0112428 | A1 * | 5/2008 | Seidel ............................ | 370/436 |
| 2008/0113667 | A1 * | 5/2008 | Seidel et al. ................... | 455/434 |
| 2009/0047916 | A1 * | 2/2009 | Haykin ...................... | 455/115.1 |
| 2009/0052570 | A1 * | 2/2009 | Haykin .......................... | 375/267 |

FOREIGN PATENT DOCUMENTS

| | | |
|---|---|---|
| CN | 101040470 A | 9/2007 |
| EP | 2 241 157 B1 | 10/2010 |
| WO | WO 2004/038549 A2 | 5/2004 |

OTHER PUBLICATIONS

Author Unknown, Definition of Tangible, Merriam Webster Dictonary, retrieved from www.m-w.com on Sep. 9, 2013, p. 1.*
Clancy, T. Charles, "Achievable Capacity Under the Interference Temperature Model", INFOCOM 2007, $26^{th}$ IEEE International Conference on Computer Communications, May 1, 2007, pp. 794-802, XP031093634.
Sharma, Manuj et al., "Channel Selection under Interference Temperature Model in Multi-hop Cognitive Mesh Networks", New Frontiers in Dynamic Spectrum Access Networks, Apr. 1, 2007, $2^{nd}$ IEEE International Symposium, pp. 133-136, XP031095612.
Hoppensteadt, F. C. et al., "Weakly Connected Neural Networks", SpringerVerlag, New York, Aug. 20, 1997, 13 pages.

(Continued)

*Primary Examiner* — John Blanton
*Assistant Examiner* — Christopher Crutchfield
(74) *Attorney, Agent, or Firm* — Harrington & Smith

(57) ABSTRACT

The exemplary embodiments of the invention enable self-organizing decentralized functionalities in wireless networks, such as ones having an arbitrary topology (e.g., cognitive radio networks), that utilize non-continuous communication, such as packet-based communication. In one exemplary embodiment of the invention, a method includes: making at least one locally available decision or measurement by a first apparatus; and performing a local exchange of information between the first apparatus and at least one second apparatus within a decentralized wireless communication network that at least partially utilizes packet-based communication, wherein the local exchange of information enables cooperation between the first apparatus and the at least one second apparatus in making a collective decision at least partially based on at least one local decision or measurement.

30 Claims, 12 Drawing Sheets

(56) References Cited

OTHER PUBLICATIONS

Acebron, J. et al., "The Kuramoto model: A simple paradigm for synchronization phenomena", Jan. 2005, pp. 137-185, Reviews of Modern Physics, vol. 77.

Barbarossa, S. et al., "Decentralized Maximum-Likelihood Estimation for Sensor Networks Composed of Nonlinearly Coupled Dynamical Systems", Jul. 2007, pp. 3456-3470, IEEE Transactions on Signal Processing, vol. 55, No. 7.

Barbarossa, S. et al., "Bio-Inspired Sensor Network Design", May 2007, pp. 26-35, IEEE Signal Processing Magazine.

Mirollo, R. E. et al., "Synchronization of Pulse-Coupled Biological Oscillators", Dec. 1990, pp. 1645-1662, SIAM J. Appl. Math, vol. 50, No. 6.

Hong, Y.W. et al., "A Scalable Synchronization Protocol for Large Scale sensor Networks and Its Applications", May 2005, pp. 1085-1099, IEEE Journal on Selected Areas in Communications, vol. 23, No. 5.

Kuramato, Y., Notes in Physics, "Self-Entrainment of a Population of Coupled Non-Linear Oscillators", Springer, NY 1975, pp. 420-422.

Haykin, S., "Cognitive Radio: Brain-Empowered Wireless Communications", Feb. 2005, pp. 201-220, IEEE Journal on Selected Areas in Communications, vol. 23, No. 2.

\* cited by examiner

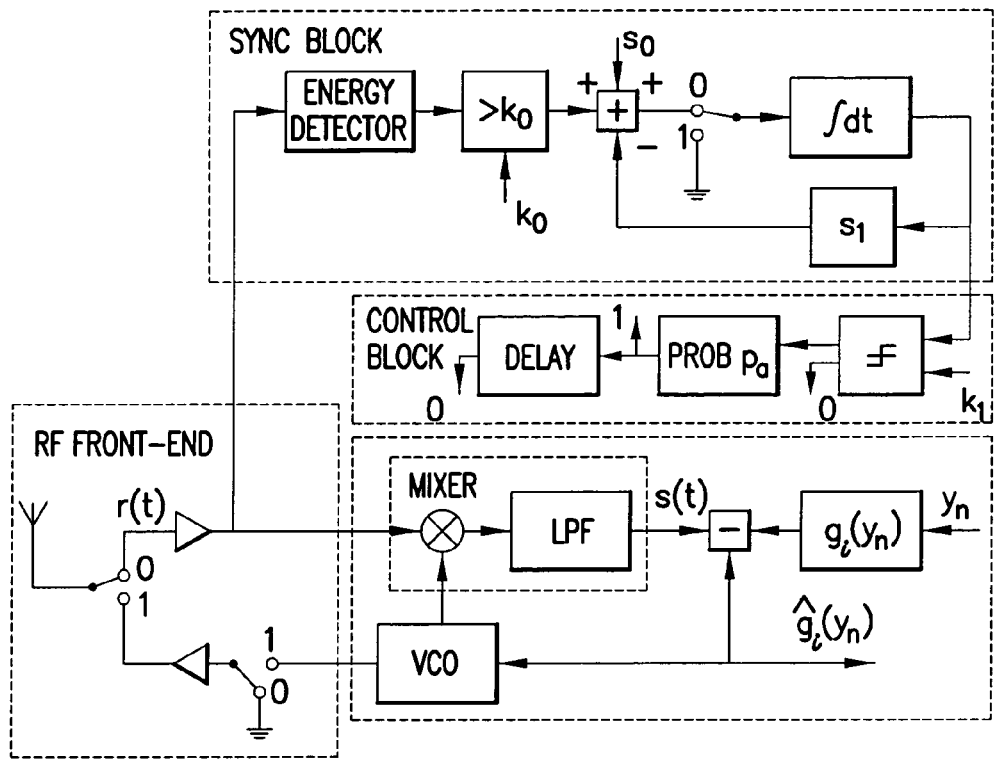

FIG.11

131 — MAKING AT LEAST ONE LOCALLY AVAILABLE DECISION OR MEASUREMENT BY A FIRST APPARATUS

132 — PERFORMING A LOCAL EXCHANGE OF INFORMATION BETWEEN THE FIRST APPARATUS AND AT LEAST ONE SECOND APPARATUS WITHIN A DECENTRALIZED WIRELESS COMMUNICATION NETWORK THAT AT LEAST PARTIALLY UTILIZES PACKET-BASED COMMUNICATION, WHEREIN THE LOCAL EXCHANGE OF INFORMATION ENABLES COOPERATION BETWEEN THE FIRST APPARATUS AND THE AT LEAST ONE SECOND APPARATUS IN MAKING A COLLECTIVE DECISION AT LEAST PARTIALLY BASED ON AT LEAST ONE LOCAL DECISION OR MEASUREMENT

FIG.13

APPARATUS, METHODS, AND COMPUTER PROGRAM PRODUCTS PROVIDING IMPROVED COMMUNICATION IN DECENTRALIZED WIRELESS NETWORKS

TECHNICAL FIELD

The exemplary and non-limiting embodiments of this invention relate generally to wireless communication systems, apparatus, methods and computer program products and, more specifically, relate to communication and/or synchronization within decentralized wireless communication systems.

BACKGROUND

In current cellular networks, centralized synchronization protocols are widely used to establish and maintain coordination among the network nodes. However, centralized methods may be sensitive to congestion problems and failures of central (fusion) stations. Thus, centralized techniques may not be considered robust and may be considered inefficient in complex networks, at least with respect to scaling, changes in topology and mobility. In contrast, distributed synchronization and self-synchronization, well known phenomena in biological and physical systems, have recently attracted growing attention in engineering.

Reference with regard to dynamic systems and/or synchronization may be made to the following:

Hoppensteadt F. C. and Izhikevich E. M., "Weakly Connected Neural Networks". Springer-Verlag, New York, 1997.

Strogatz S., "Sync: The Emerging Science of Spontaneous Order", NY: Hyperion 2003.

Acebron J. et al, "The Kuramoto model: A simple paradigm for synchronization phenomena", Reviews of Modem Physics, v. 77, pp. 137-185, January 2005.

S. Barbarossa, G. Scutari, "Decentralized Maximum-Likelihood Estimation for Sensor Networks Composed of Nonlineary Coupled Dynamical Systems", IEEE Trans. on Signal Processing, pp. 3456-3470, v. 55, No. 7, July 2007.

S. Barbarossa, G. Scutari, "Bio-Inspired Sensor Network Design", IEEE Signal Processing Magazine, pp. 26-35, May 2007.

Mirollo R. E, Strogatz S. H., "Synchronization of pulse-coupled biological oscillators", SIAM J. Appl. Math, v. 50, pp. 1645-1662, No. 6, December 1990.

Hong Y.-W., Scaglione A., "A Scalable Synchronzation Protocol for Large Scale Sensor Networks and its Applications", IEEE JSAC, v. 23, pp. 1085-1099, No. 5, May 2005.

Kuramato Y., Lec. Notes in Physics No. 30, Springer N.Y. 1975.

Haykin, S., "Cognitive Radio: Brain-Empowered Wireless Communications", IEEE Journal on Selected Areas in Communications, vol. 23, no. 2, pp. 201-220, February 2005.

Future development of wireless communication systems assumes co-existence of various communication systems with dynamical frequency allocation/access without centralized control. It gives rise to the concept of cognitive radio networks. One definition for cognitive radio is given by Haykin as follows: "The cognitive radio, built on a software-defined radio, is defined as an intelligent wireless communication system that is aware of its environment and uses the methodology of understanding-by-building to learn from the environment and adapt to statistical variations in the input stimuli, with two primary objectives in mind: highly reliable communication whenever and wherever needed; efficient utilization of the radio spectrum." See Haykin, S., "Cognitive Radio: Brain-Empowered Wireless Communications", IEEE Journal on Selected Areas in Communications, vol. 23, no. 2, pp. 201-220, February 2005.

SUMMARY

In an exemplary embodiment of the invention, an apparatus includes: a transceiver configurable for local exchange of information with at least one other apparatus within a decentralized wireless communication network that at least partially utilizes packet-based communication; and a control unit configurable for making at least one locally available decision or measurement, wherein the control unit is further configurable to cooperate with the at least one other apparatus in making a collective decision at least partially based on at least one local decision or measurement.

In another exemplary embodiment of the invention, an apparatus includes: means for local exchange of information with at least one other apparatus within a decentralized wireless communication network that at least partially utilizes packet-based communication; means for making at least one locally available decision or measurement; and means for cooperating with the at least one other apparatus in making a collective decision at least partially based on at least one local decision or measurement.

In another exemplary embodiment of the invention, a method includes: making at least one locally available decision or measurement by a first apparatus; and performing a local exchange of information between the first apparatus and at least one second apparatus within a decentralized wireless communication network that at least partially utilizes packet-based communication, wherein the local exchange of information enables cooperation between the first apparatus and the at least one second apparatus in making a collective decision at least partially based on at least one local decision or measurement.

In another exemplary embodiment of the invention, a program storage device readable by a first apparatus, tangibly embodying a program of instructions executable by the first apparatus for performing operations, said operations including: making at least one locally available decision or measurement; and performing a local exchange of information between the first apparatus and at least one second apparatus within a decentralized wireless communication network that at least partially utilizes packet-based communication, wherein the local exchange of information enables cooperation between the first apparatus and the at least one second apparatus in making a collective decision at least partially based on at least one local decision or measurement.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 11 illustrates exemplary components for a scheme with packet-based transmission and quasi-continuous time processing;

FIG. 13 depicts a flowchart illustrating one non-limiting example of a method for practicing the exemplary embodiments of this invention.

DETAILED DESCRIPTION

Figure 1:
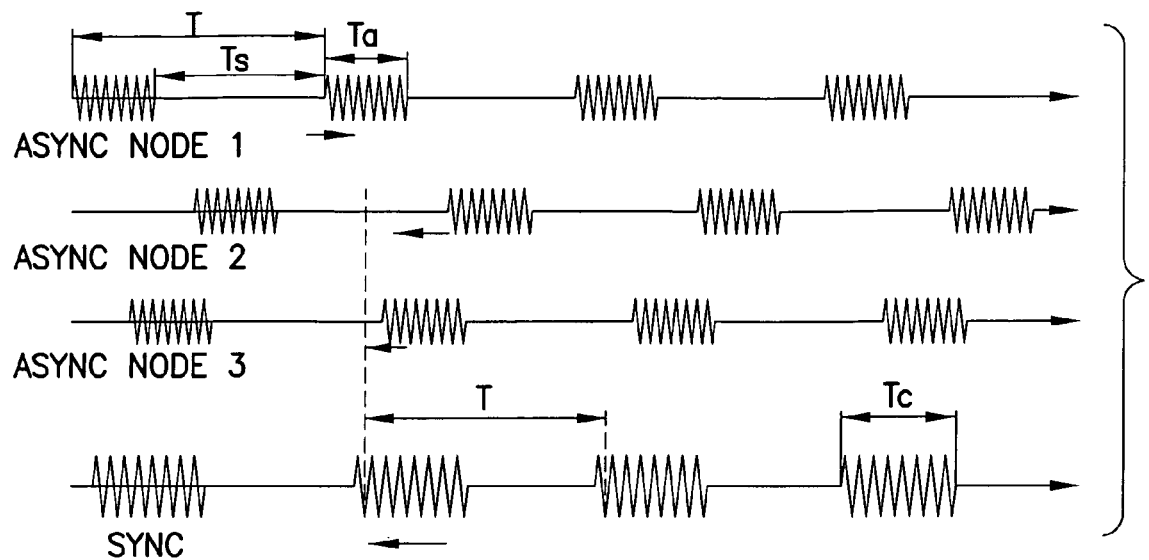
FIG. 1 depicts transition timing (asynchronous and synchronized) for different nodes within an exemplary wireless network.

Consider the dynamics of states in a connected network where nodes, initialized at different states (e.g., local opinions) are interacting with an aim to reach a global (over the network) stable behavior. The global stable state may take the form of a consensus state (the same state for all nodes) or a synchronous state (synchronous dynamics of all states). The network dynamics may be modelled as local dynamical systems (or nodes) coupled via interactions.

As an example, dynamics of a local state in the simplest case may be described as dynamics of an oscillator, where a local state is determined by the local oscillator phase. At the abstract level, the local states may present a decision variable in distributed control or local estimate of a parameter of interest. In this case, the network's dynamical equations describe a distributed decision making where a consensus (e.g., a global estimate) corresponds to a sync or self-organization of coupled oscillators.

This generic model will be used below as a non-limiting, exemplary basis for further discussion and consideration of decentralized synchronization and distributed estimation/detection/control in cognitive radio systems and networks.

Time synchronization plays an important role in many communication systems and is used, for example, in joint estimation/detection methods, data fusion schemes, and media access methods. In current cellular networks, the centralized synchronization protocols are widely used to establish and maintain coordination among the nodes. As noted above, centralized methods are known to be sensitive to congestion problems and failures of central (fusion) stations (e.g., base stations, access nodes). In contrast, conventional decentralized synchronization methods often require complicated signal processing and/or message exchange at high layers.

In decentralized networks, without dedicated fusion and control centers, impulse-like coupling may be used to establish and maintain time synchronization among transmitted packets, for example. In addition, phase-like coupling may be used during packet durations to implement distributed estimation/control, for example. However, as explained in further detail below, conventional techniques relating to distributed impulse synchronization and distributed estimation based on continuous transmissions are ill-suited for application to packet-based communication systems which generally utilize (e.g., rely on) synchronization.

The exemplary embodiments of the invention enable self-organizing decentralized functionalities in wireless networks, such as ones having an arbitrary topology (e.g., cognitive radio networks), that utilize non-continuous communication, such as packet-based communication. In one non-limiting, exemplary embodiment, a mobile terminal includes a transceiver and a control unit. The transceiver is configured for local exchange of information with at least one other mobile terminal within a decentralized wireless communication network (e.g., a cognitive radio network) that at least partially utilizes packet-based communication. The control unit is configured for making at least one locally available decision or measurement. The control unit is also configured to cooperate with the at least one other mobile terminal in making a collective decision at least partially based on at least one local decision or measurement (e.g., of the mobile terminal, of the other mobile terminal).

In one exemplary embodiment of the invention, estimation/control methods are provided for use in complex networks where a global estimate or decision is obtained with a distributed approach without fusion or centralized control centers (e.g., base stations). The exemplary approach is based on local exchange of information among nearby nodes within a connected (wireless) network that allows, under certain conditions, the nodes to reach a global decision (e.g., consensus, collective decision) based on locally available decisions/measurements. In particular, network nodes are considered as local dynamical systems with impulse-like coupling to establish time synchronization among the transmitted packets, together with phase-coupling during packet durations to achieve distributed estimation/control.

The exemplary embodiments of the invention may be implemented as a low power/complexity distributed synchronization method which may be performed in the analog domain without need for power-hungry analog-to-digital conversion (ADC) and/or extensive digital signal processing. While described below with reference to cognitive radio systems and networks, the exemplary embodiments of the invention are not limited thereto and may be utilized in conjunction with other decentralized systems and networks.

In one exemplary embodiment, the proposed distributed synchronization is based on the self-synchronization of pulse-coupled oscillators which is observed in many biological and physical systems. Collective behavior of pulse-coupled oscillators has been studied. Recently, pulse-coupled methods were proposed for wireless sensor networks (see Hong) and impulse based UWB. However, previously-described techniques are not suitable for use in conjunction with packet-based communication. The exemplary embodiments of the invention expand on these concepts to provide support for non-continuous communication, such as packet-based transmission, and form a basis for distributed estimation/control, as described below.

As a non-limiting example, consider a wireless network with arbitrary topology and assume that all nodes have access to a common (radio) channel to periodically (with a period T) exchange information with their neighbors by sending packets of duration $T_a$. Initially, transmission time instants for different nodes are not synchronized (see the three upper curves in FIG. 1, labeled Async node 1, Async node 2, and Async node 3). During silence period $T_s$ each node measures energy from other nodes at the common channel and compares it to a threshold $k_0$. The threshold level may be selected, for example, depending on noise level and reliability requirements. When all packets are in sync, the measured value (hence, control signals) should not exceed the threshold (see the fourth curve in FIG. 1, labeled Sync). If the measured value is above the threshold, this value is used to form a control signal to adjust the next transmitting instant.

Local dynamics of each node are described by the node's internal state, $x_n(t)$. Assume that $x_n(t)$ is a monotonically increasing function of time from some initial state to a threshold $k_1$. Once the local state reaches a threshold, $x(t_k) > k_1$, the node transmits a pulse and returns to the initial state (see the lower part of FIG. 2). When nodes are isolated (or the system is in a global sync state), then all nodes transmit pulses with a period T.

Figure 2:
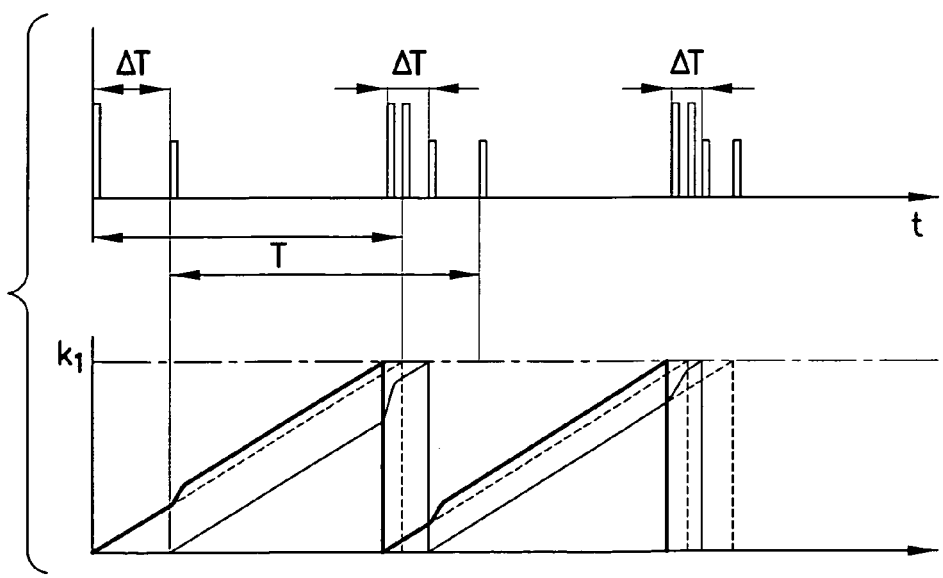
FIG. 2 shows an impulse sync of two nodes with a linear behavior of local states.

As an illustration, the impulse sync of two nodes with a linear behavior of local states is shown in FIG. 2. The upper and lower parts show pulse transmission instants and dynamics of local states, respectively. In the absence of interactions, the dynamics of states and transmission moments are shown by dashed lines and not filled impulses, respectively. In the presence of interactions, the energy sensed during the silence period affects the state (solid lines) and drives transmission moments to sync ($\Delta T \to 0$).

One possible method to form control signals with impulse transmission is described in Hong, where a voltage on a resistor-capacitor (RC) circuit was used as the state variable. An important assumption in Hong is that impulses are short and do not overlap. At least some exemplary embodiments of the invention described herein extend this scheme for packet-based transmission with possible overlapping. The purpose of (radio) packet based transmission is two-fold: (i) to reduce/eliminate de-sync effects due to multipath propagation unavoidable in short impulse transmission; and (ii) to facilitate distributive estimation/control, as addressed in the following sections.

Similar to Hong, system dynamics may be described by a leaky integrate-fire model:

$$\dot{x}_n(t) = S_0 - S_1 x_n(t) \tag{0}$$

where $S_0$ is associated with accumulation speed and $S_1$ is a leakage factor.

One possible implementation may comprise a synchronization block, similar to the "sync block" in FIG. 11, where a threshold $k_0$ controls noise sensitivity; $S_0$, $S_1$ and $K_1$ regulate coupling strength and the firing threshold; a delay block inside of a control unit sets a duration of transmit (Tx) mode (Tx mode: switches are at "1"; Rx mode: switches are at "0").

Figure 3:
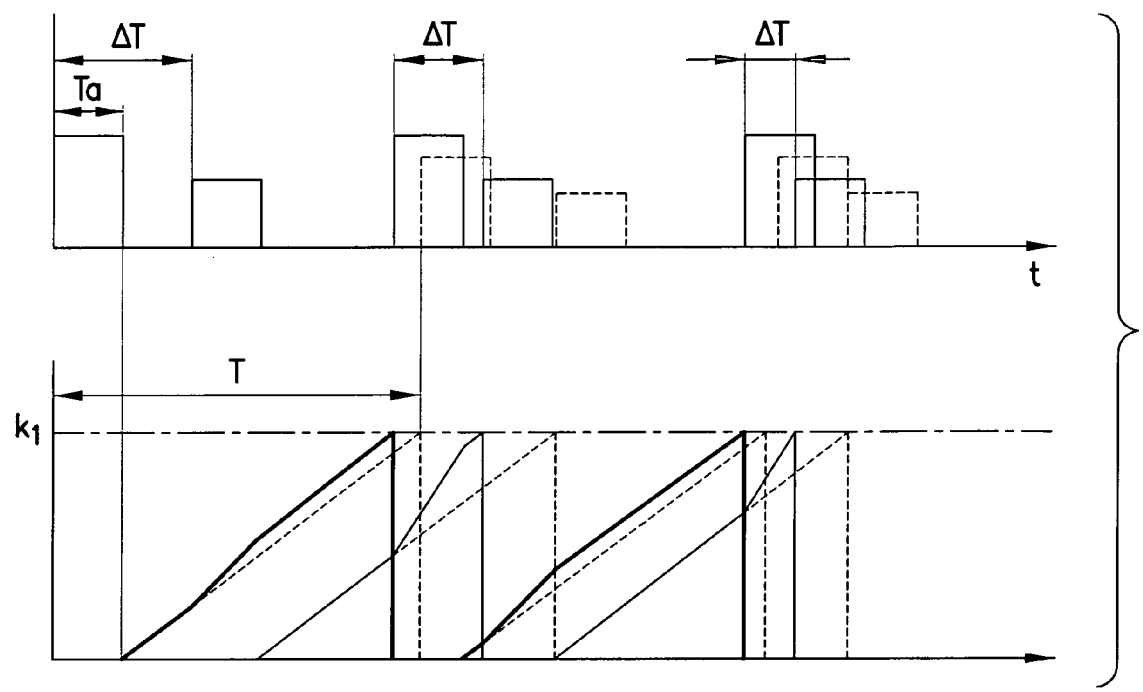
FIG. 3 shows synchronization for packet-based transmission of two nodes with a linear behavior of local states.
Figure 4A:
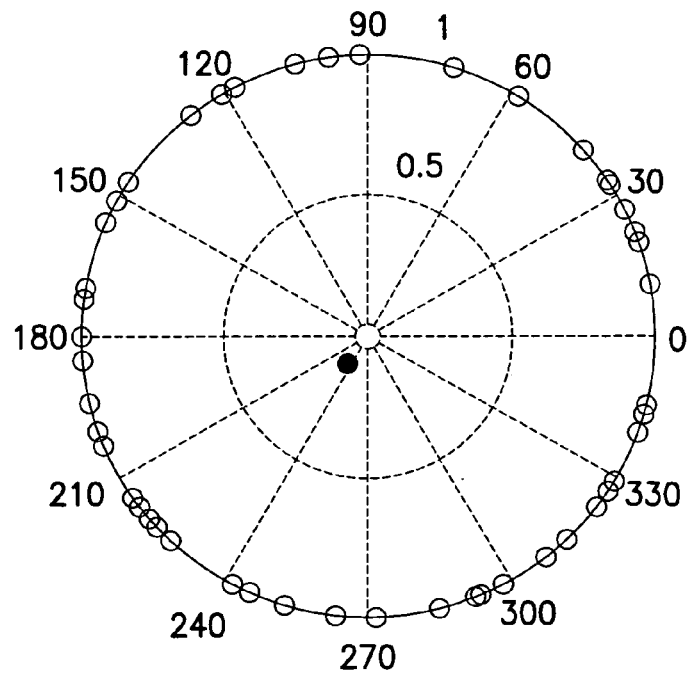
FIGS. 4(a)-4(d) present time evolution of randomly initialized oscillator phases obtained by numerically solving a system of equations (equation 3) for N=50.
Figure 4B:
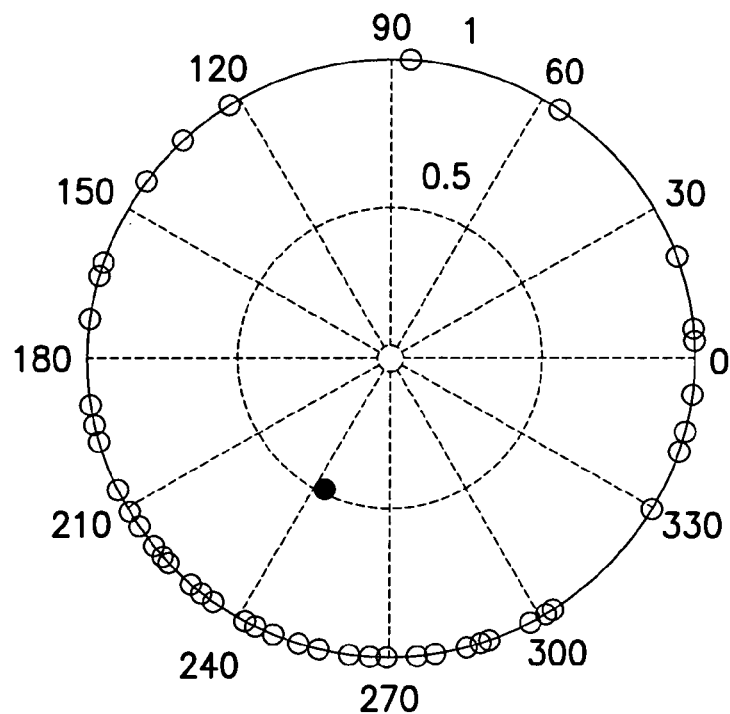
Figure 4C:
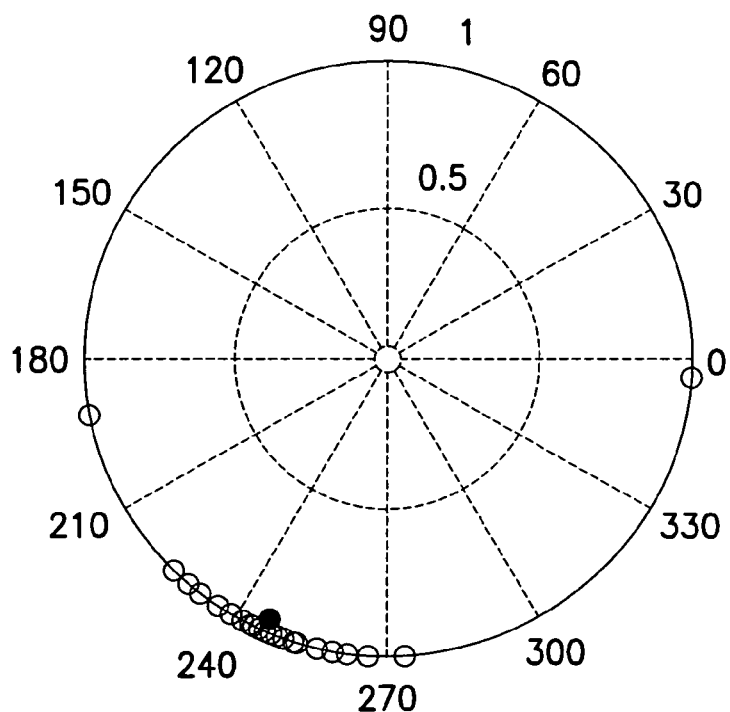
Figure 4D:
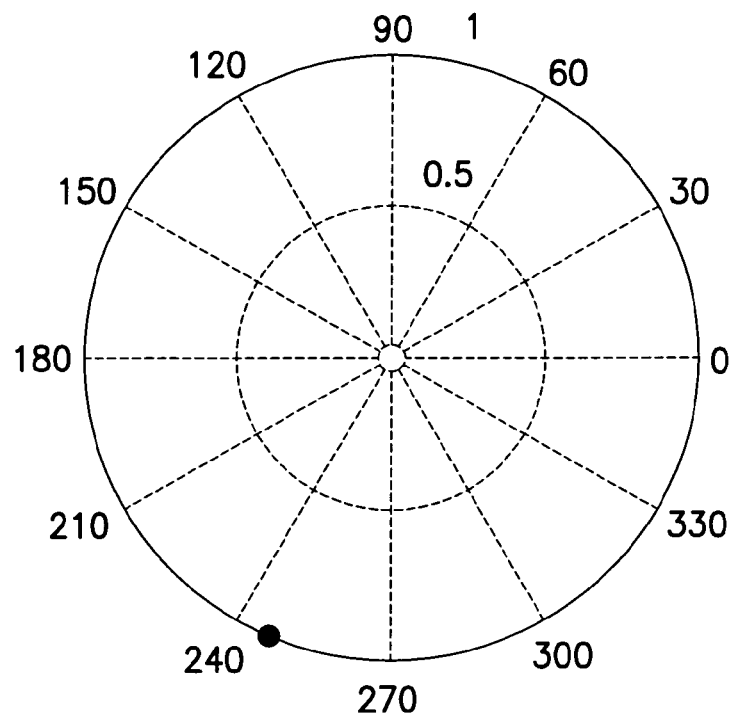

One difference with respect to impulse transmission is that due to the duration of (radio) packet $T_a$ the moments of transmission will be delayed (moved forward along the time scale) sequentially with respect to each other, which in turn results in delay accumulation and prevents synchronization. To avoid delay accumulation, one may use transmission "in advance", which may be achieved by the reducing the threshold $k_1$. Another way is to adjust the duration of the silent period as $T_s = T - T_a$ (see FIG. 3). Similar to impulse transmission, dashed and solid lines in FIG. 3 show states for two nodes with and without interactions.

Packet transmission reduces the synchronization (sync) accuracy (in case of sync the sum of all packets (mean field) duration is $T_c > T_a$). Fortunately, for distributed estimation/control at this stage, precise synchronization is not needed: it is enough that at sync, (radio) packets from different nodes are reasonably overlapped to create the effective mean field used in the following as a correction factor for the local decision.

For cognitive radio systems, the local measurements may present interference temperature at given frequency band(s) at different locations. With a distributed control, a local state may present a local decision, a planned action and/or a behavior strategy from a game theory perspective, for example.

As a non-limiting example, consider a network of N nodes where each n-th node (i) has an access to a common interaction media (e.g. radio or logical channels) and (ii) comprises:

(a) a local decision block which periodically makes a local decision (or measurement) on a (vector-) parameter $y_n(t_k)$ (e.g., interference temperature in one or more certain frequency bands) at time instant $t_k$;

(b) a processing block to calculate a certain function of the measurement, $g_n(y_n(t_k))$, which presents an initial state of the n-th node (in the simplest case $g_n(y_n(t_k)) = y_n(t_k)$);

(c) a measurement block that periodically senses the environment to obtain (e.g., receives via a receiver or transceiver) local decisions from other nodes;

(d) a dynamical system with a state $x_n(t)$ which evolves as a function of a local decision $g_n(y_n(t_k))$ and/or decisions obtained from other states $x_m(t)$; and (e) an interface block to map a local state on some physical carrier and periodically make it available to neighbors (e.g., periodic broadcasting, whether regular, irregular or random).

As a whole, this system allows for the implementation of distributed estimation/control without data fusion centers, where each node makes a local decision (or forms a local opinion) about a vector value, adjusts its decision based on decisions from one or more other modes and then broadcasts it further.

The system dynamics may be described by motion equations in discrete time:

$$\dot{x}_n(t_k) = g_n(y_n(t_k)) + \frac{K}{c_n} \sum_{m=1}^{N} a_{nm} h[x_m(t_k - \tau_{nm}) - x_n(t_k)] + \eta_n(t_k) \tag{1a}$$

$$n = 1, \ldots, N$$

or in continuous time:

$$\dot{x}_n(t) = g_n(y_n(t)) + \frac{K}{c_n} \sum_{m=1}^{N} a_{nm} h[x_m(t - \tau_{nm}) - x_n(t)] + \eta_n(t) \tag{1b}$$

$$n = 1, \ldots, N$$

where h is a scalar coupling function, K is a global control gain, $c_i$ is a local positive coefficient (e.g., associated with reliability or a signal-to-noise ratio (SNR) of the local measurement); the coefficients $a_{nm}$ describe coupling strength among the nodes, $\tau_{nm}$ is a propagation delay from node n to node m, and $\eta_n(t)$ is the couping noise.

Real coupling coefficients $a_{nm}$ may be associated with channel parameters, $a_{nm}^2 = p_m |h_{nm}|^2 / d_{nm}^2$, where $p_m$ is the power transmitted by m-th node, $h_{nm}$ is the fading coefficient, $d_{nm}$ is the distance between nodes n and m. In general, the coefficients $a_{nm}$ may be asymmetric to take into account, e.g., different transmit powers at different nodes.

If the coupling function is $h(x) = \sin x$, then the dynamics may be described by the well-known Kuramoto model of coupled oscillators:

$$\dot{\theta}_n(t) = \omega_n(y_n(t)) + \frac{K}{c_n} \sum_{m=1}^{N} a_{nm} \sin[\theta_m(t - \tau_{nm}) - \theta_n(t)] + \eta_n(t) \tag{2}$$

$$n = 1, \ldots, N$$

However, equations (1a) and (1b) present a more general case of coupled dynamical systems, where $x_n$ is a state of a local dynamical system (not necessarily an oscillator's phase) and h( ) and $g_n$( ) are coupling and processing functions of nodes. The system may not necessarily converge for an arbitrary processing function g(.), but it is known to converge for such such functions as min, max, and geometrical mean. In the following, and as a non-limiting example, a continuous time model is considered that allows for simplification of the treatment and the obtaining, at least in some cases, of close-form solutions.

Due to radio-wave propagation loss in wireless communications, the broadcasted signals decay with the distance ($a_{nm}$=f($d_{nm}$)), which results in local coupling among dynamical systems (and/or nodes). Below, it is shown that under certain conditions the local coupling creates stable clusters of decisions which may be interpreted as a dynamic spectrum allocation.

As a non-limiting example, consider first the behavior of a globally connected network without noise and/or delays in interactions. Dynamics of this network may be described by the Kuramoto model for globally coupled oscillators:

$$\dot{x}_n(t) = g_n(y_n(t)) + \frac{K}{N}\sum_{m=1}^{N}\sin[x_m(t) - x_n(t)] \quad (3)$$

$$n = 1, \ldots, N$$

where $g_n(y_n(t))=\omega_n$ are local frequencies and $x_n(t_0)=\theta_n(t_0)$ are initial phases.

For cognitive radio system measurements $y_n$ (for n=1, ..., N), interference temperature(s) may be present at a given frequency band and/or at different locations. In the case of distributed control, y, may present a local decision, a planned action and/or a behavior strategy from a game theory perspective.

These equations have a range of solutions from periodic to chaotic. For example, periodic solutions include: (i) a phase sync (consensus) state $\theta_n(t)=\theta_0(t)$ for all n; (ii) a "phase-lock" state where all oscillators have a same waveform but are shifted by a fixed phase $\theta_n(t)=\theta_0(t+nT/N)$ with T as the oscillation period (creating a rotating wave); and/or (iii) partial sync there both states may co-exist.

Kuramoto showed that the system of equation (3) may be analytically tractable and in the limit N→∞ there is a critical value of coupling strength $K_c$, such that for K>$K_c$ both frequency and phase sync appear in the system.

Define a complex mean field for N oscillators with equal unit amplitude as:

$$R(t) = \frac{1}{N}\sum_{n=1}^{N} e^{i\theta_n(t)} = re^{i\psi(t)} \quad (3b)$$

Global coupling may be seen as the total mean field effect acting on a selected oscillator, and equ. (3) then may be rewritten as:

$$\frac{d\theta_n}{dt} = \omega_n + Kr\sin(\psi - \theta_n) \quad (4)$$

where K is the strength of all-to-all coupling, and r and ψ are mean-field amplitude and phase, respectively. If identical oscillators are all in phase-sync, then oscillations added in phase create just one oscillation with max mean field amplitude (r=1), while random-phase oscillators show a chaotic behavior with minimum mean field amplitude (r→0). For this reason, the mean-field amplitude r is also referred to as the order factor.

The next step is to define a mapping of local decision/measurements onto the model (3). There may be different mappings of local measurements, for example: (i) as a local initial phase; (ii) as a local initial frequency; and/or (iii) as a data packet. As will be shown below, the cases of (i) and (ii) may be implemented in the analog (e.g., RF) domain without a need for high speed ADC, while data access in the case of (iii) assumes processing in the base-band domain.

First consider a mapping where a local measurement is presented by a local oscillator initial phase, $x_n(t_0)=\theta_n(t_0)$, and dynamics are presented by a local oscillator frequency, $\dot{x}_n(t)=\dot{\theta}_n=\omega_n$. In the presented terminology, that means that initially the network is in the frequency sync state $g_n(y_n(t))=\omega_n=\omega_0$ (synchronous dynamics), but not in the consensus state (initial local phases or opinions, $\theta_n(t_0)$, are different).

FIG. 4 shows the evolution of phases of N=50 identical ($\omega_n=\omega_0$) oscillators with global coupling K=0.3 (shots at time instants t).

On the phase plot this common frequency appears as the collective angle motion of all oscillators. Without loss of generality, in the following use moving coordinates where $\omega_0$=0. FIGS. 4(a)-4(d) present time evolution of randomly initialized oscillator phases obtained by numerically solving the system of equations (3) for N=50. Starting from a uniform random phase distribution (FIG. 4(a)), the positive coupling k>0 in the globally coupled network results first in phase clustering (FIG. 4(b), FIG. 4(c)) followed by phase synchronization (FIG. 4(d)). As expected, the order factor (shown as a filled circle) grows as phases of oscillators are grouped and approaches a maximum when phase synchronization is reached (FIG. 4(d)).

The phase sync above may be seen as global time synchronization of identical oscillators over the network. The same behavior (phase sync) may be achieved for pulse-coupled oscillators (see Strogatz).

Another non-limiting, exemplary mapping is to map local measurements on frequencies of local oscillators.

Figure 5:
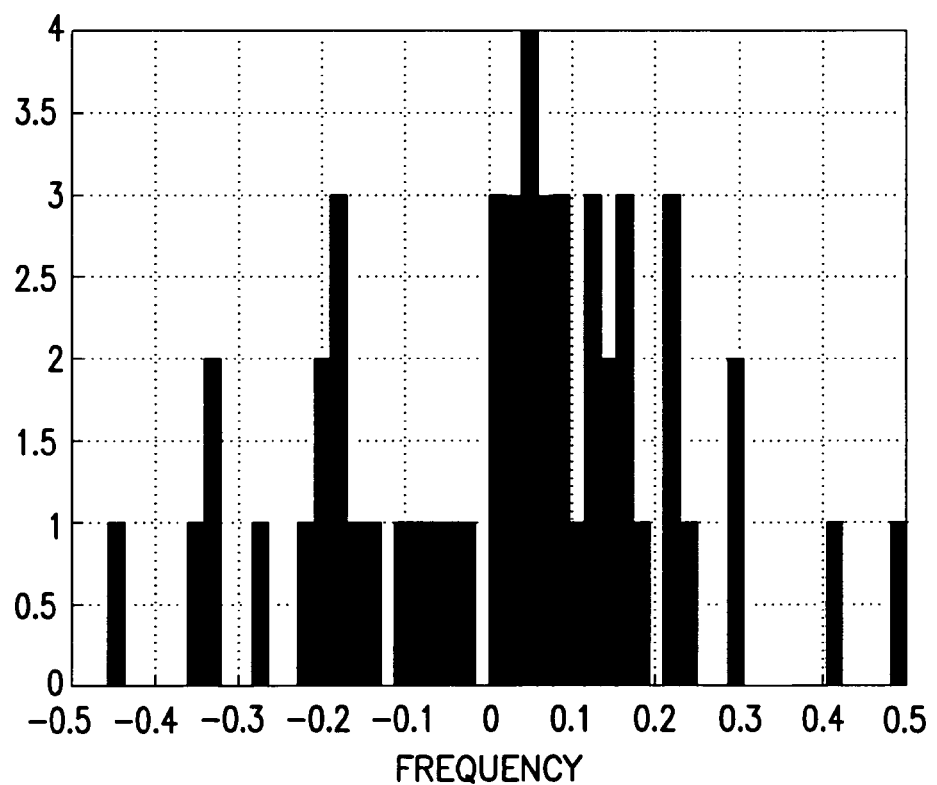
FIG. 5 depicts an exemplary distribution of local measurements used in the simulations described herein.
Figure 6A:
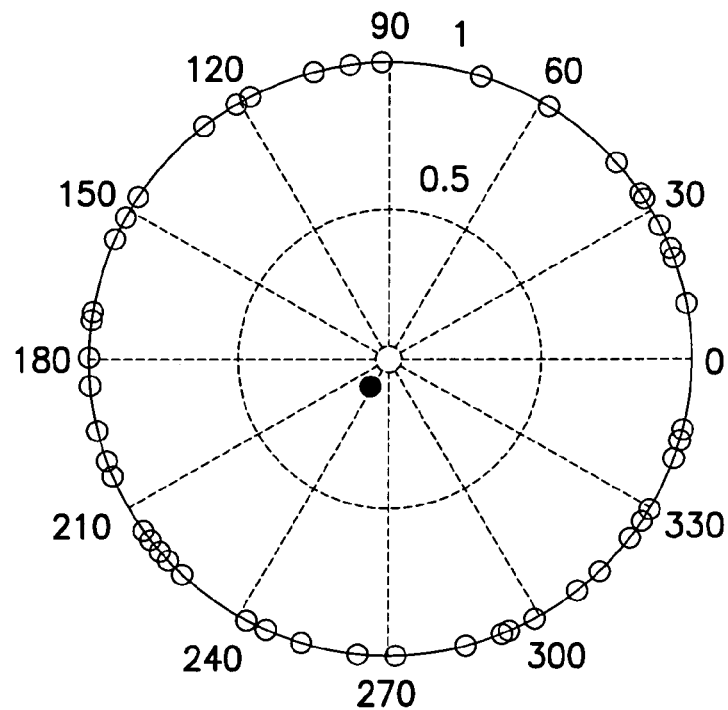
FIGS. 6(a)-6(d) shows an exemplary evolution of phases of N=50 oscillators with random normal distributed frequencies ($\sigma_\omega^2$=0.02) with different global couplings.
Figure 6B:
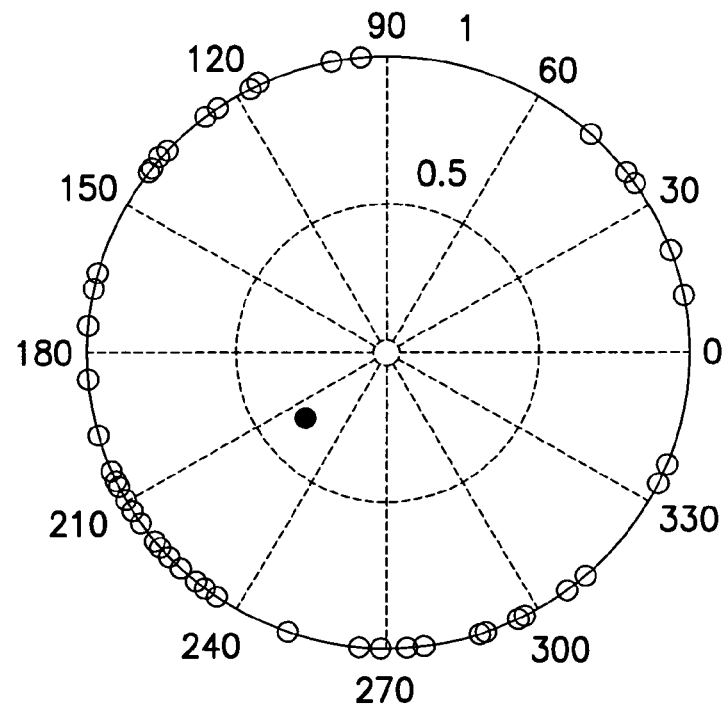
Figure 6C:
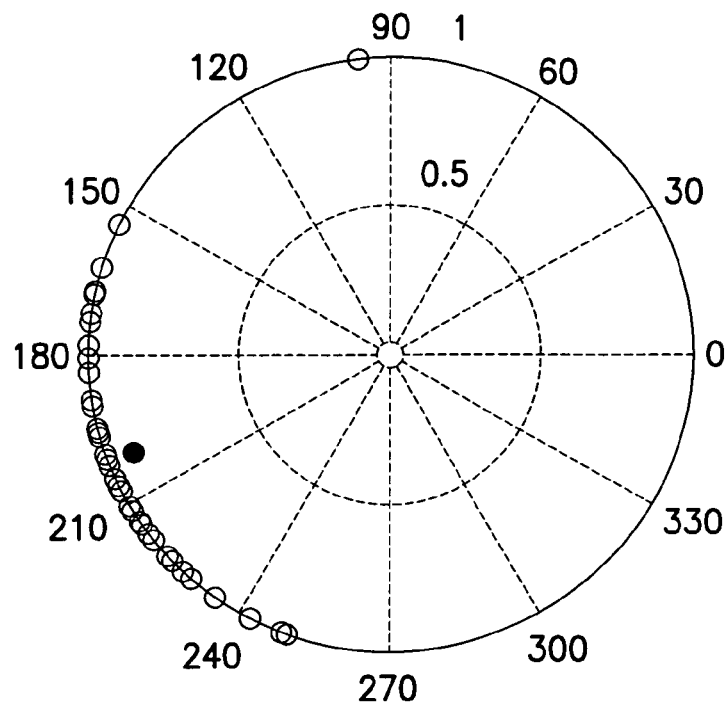
Figure 6D:
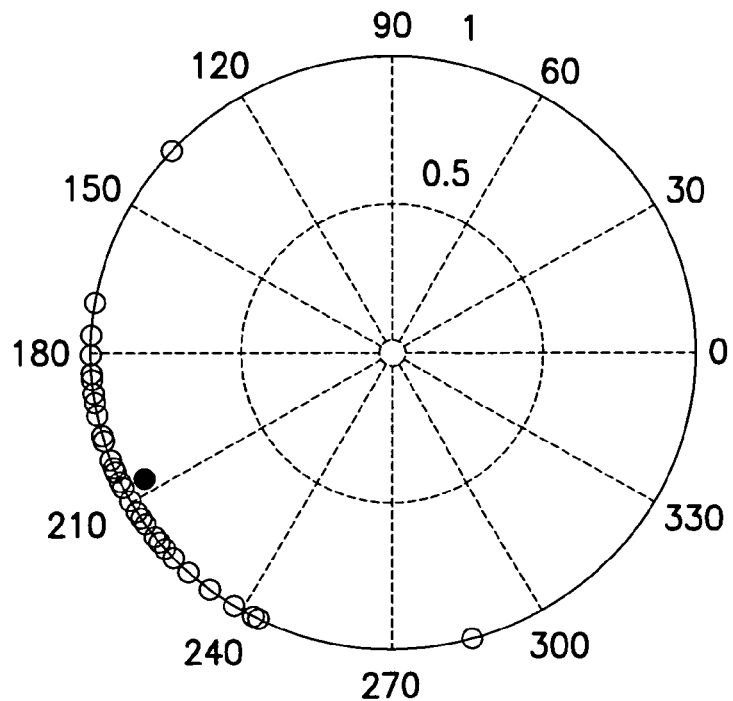
Figure 7A:
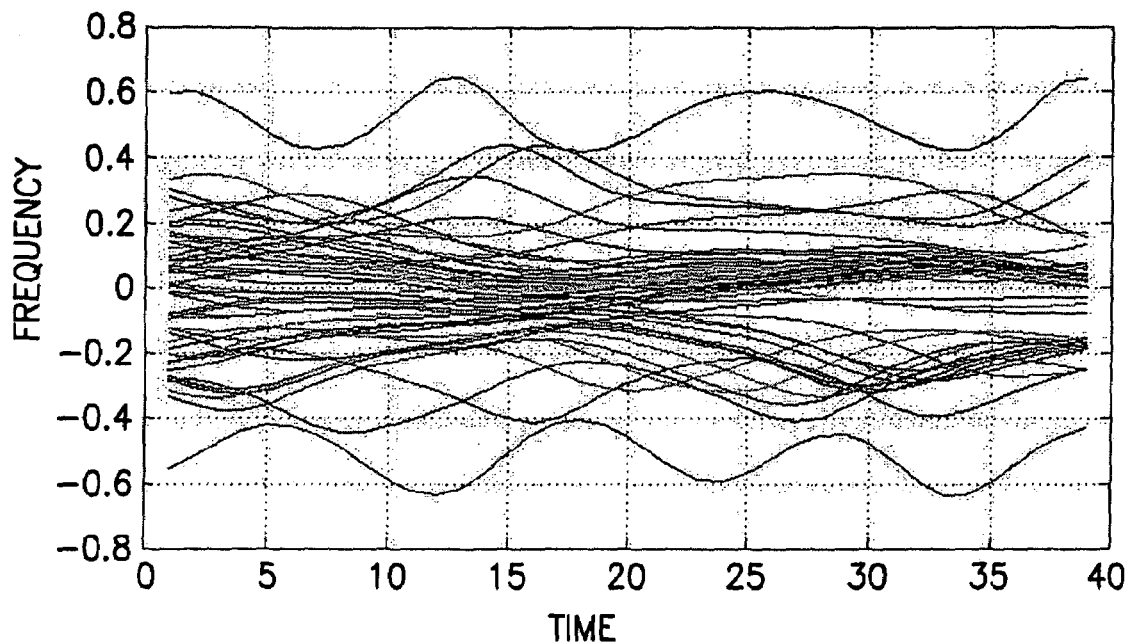
FIGS. 7(a)-7(c) illustrate an exemplary evolution of random oscillators' frequencies ($\sigma_\omega^2$=0.02) in time.

In the example below, local measurements (e.g., local frequencies) are modeled as random values taken from a Gaussian distribution with variance $\sigma_\omega^2$=0.02 (std=±14%). A histogram of frequency distribution used in the described simulations is shown in FIG. 5. Provided that coupling strength is large enough compared to frequency variations, the system evolves from quasi-chaotic (FIG. 6(a); FIG. 7(a)) to partial synchronization (FIG. 6(c); FIG. 7(c)), where oscillators with close frequencies are frequency locked, resulting in growing mean-field (the filled point in FIG. 6) which in turn attracts further staying apart (in frequency) oscillators into the frequency lock. As shown, evolution of different oscillators' frequencies and order factors r in time at different coupling strengths are depicted in FIG. 7 and FIG. 8, respectively.

Figure 8:
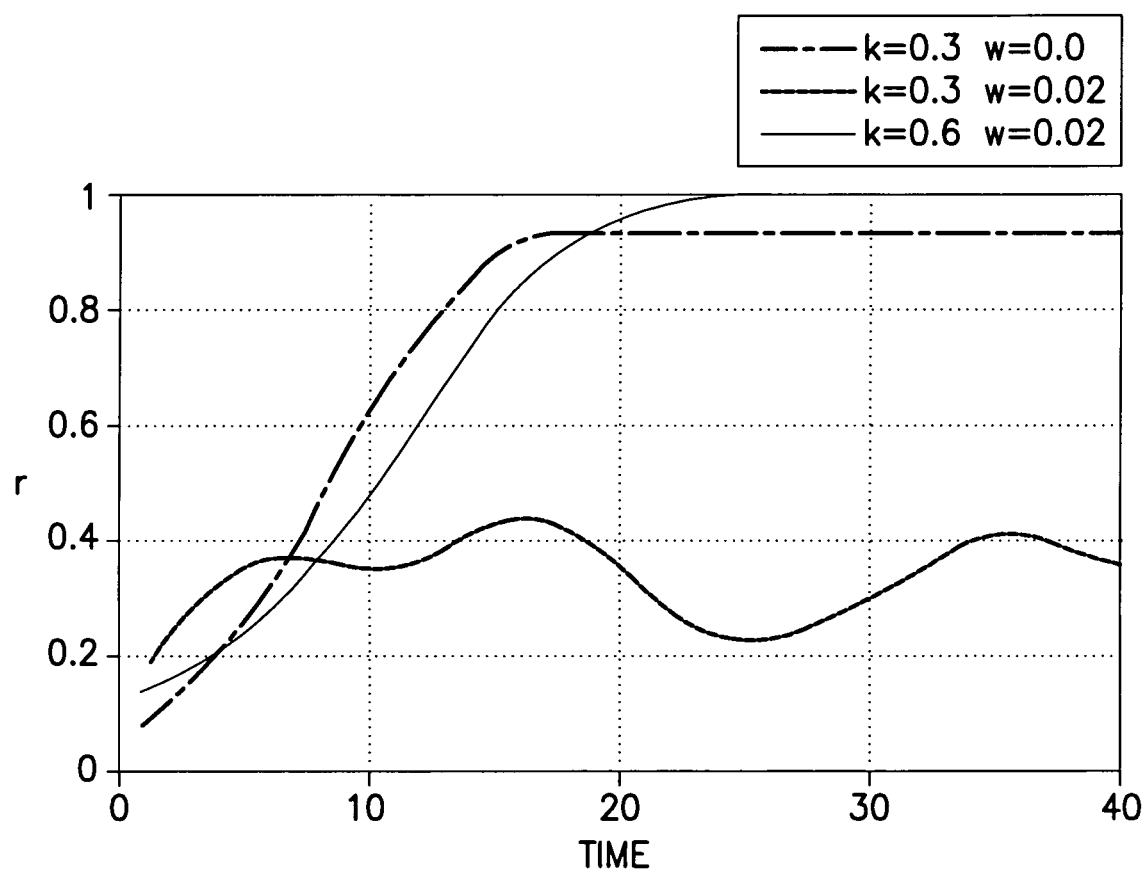
FIG. 8 shows an exemplary evolution of order parameter in time

Note that oscillators with natural frequencies $|\omega_n-\omega_0|$>Kr cannot be attracted to the frequency lock, and thus results in partial frequency sync and a lower steady-state order factor r (dashed and dash-dot lines in FIG. 8). However, even in the case where all oscillators are frequency-locked, this results at best in phase-mode locking (constant phase difference) with frequency $$\psi(t) = \omega^* = \frac{1}{N}\sum_{n=1}^{N}\omega_n,$$

but not in phase synchronization (consensus), where phase differences are zero.

Note that the model of equation (1) is more general and may take into account propagation attenuation and local SNR~$1/c_n$ that results in $$\psi(t) = \omega^* = \frac{\sum_{n=1}^{N}c_n\omega_n}{\sum_{n=1}^{N}c_n}$$

(corresponding to the ML estimate for linear estimator in additive white Gaussian noise (AWGN)).

Consider a connected network with local coupling:

$$\dot{x}_n(t) = g_n(y_n(t)) + \frac{K}{c_n}\sum_{m=1}^{N}a_{nm}\sin[x_m(t) - x_n(t)] + \eta_n(t) \quad (6)$$

Multiply each equation by $c_n$ and sum over n to obtain:

$$\sum_{n=1}^{N}c_n\dot{x}_n(t) = \quad (7)$$

$$\sum_{n=1}^{N}c_n g_n(y_n(t)) + K\sum_{n=1}^{N}\sum_{m=1}^{N}a_{nm}\sin[x_m(t) - x_n(t)] + \sum_{n=1}^{N}c_n\eta_n(t)$$

Thanks to the symmetry of coefficients $a_{nm}$ and the antisymmetry of $\sin(x) = -\sin(-x)$, if the system is in sync then:

$$\dot{x}_n(t)_{t\to\infty} \to \dot{x}^*(t) = \frac{1}{c^*}\sum_{n=1}^{N}c_n\dot{x}_n(t) + \frac{1}{c^*}\sum_{n=1}^{N}c_n\eta_n(t) = w^* + v(t) \quad (8)$$

where $c^* = \sum_{n=1}^{N}c_n$.

In other words, all state derivatives converge to a globally asymptotically stable unique (constant) value $\dot{x}_n(t)\to w^*$ irrespective of initial conditions.

FIG. 5 depicts an exemplary distribution of local measurements used in the simulations described herein.

FIGS. 6(a)-6(d) show an exemplary evolution of phases of N=50 oscillators with random normal distributed frequencies ($\sigma_\omega^2=0.02$) with different global coupling: (a) t=0; (b) t=20, k=0.3 (no sync); (c) t=20, k=0.5 (partial sync), and (d) t=40 k=0.6, (sync).

Figure 7B:
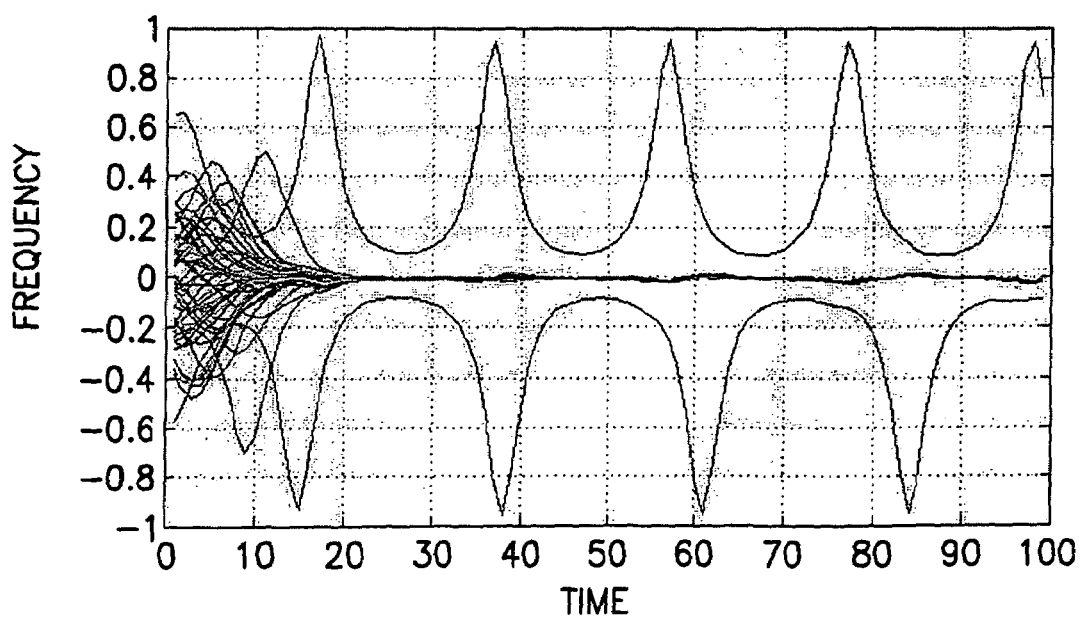
Figure 7C:
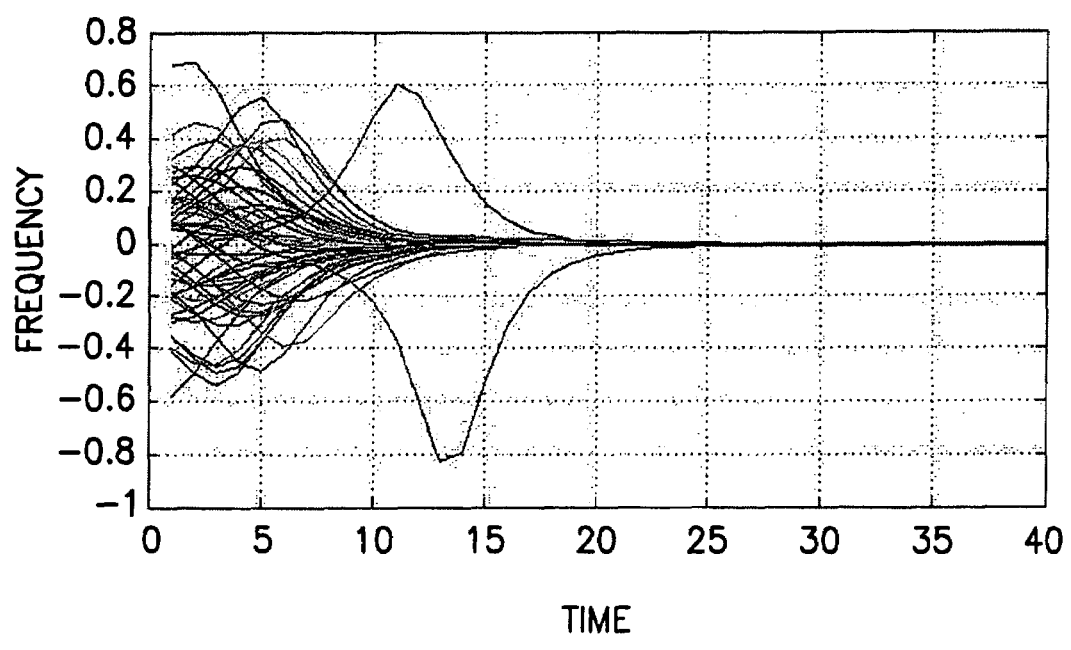

FIGS. 7(a)-7(c) illustrate an exemplary evolution of random oscillators' frequencies ($\sigma_\omega^2=0.02$) in time.

FIG. 8 shows an exemplary evolution of order parameter in time.

In practice, identical local dynamics (e.g., identical local oscillators) are difficult to implement. Furthermore, it is known that in the presence of coupling noise a consensus (e.g., phase-lock) is more difficult to achieve than synchronous dynamics (e.g., phase-lock).

Fully-connected networks generally have a smaller average path length and larger clustering coefficients that facilitate a fast convergence. However, most large-scale real networks (e.g., cellular wireless networks) are only sparsely (or locally) connected. Convergence to a consensus on such networks with different sparse topologies has been studied in a number of papers. In particular, recently it was shown that if the network is connected (i.e., there is a path between any pair of nodes), local exchange of information among the nearby nodes is sufficient to reach a global consensus on the average of observable values without requiring any control node. A global consensus can be reached through linear or non-linear coupling and also can be used to track time-variant phenomena.

As noted above, despite the different local decision vectors $g_n(t)$, for a fully (all-to-all) connected network there is a transition to synchronicity at a critical coupling strength $$K > K_c^{(global)} = \frac{2}{\pi\hat{g}N},$$

where $\hat{g}$ is the mode of the continuous unimode state distribution and $$\hat{g} = \max_{N\to\infty}\{g_1, g_2, \ldots, g_N\}$$

with a normalization $$\lim_{N\to\infty}\frac{1}{N}\sum_{n=1}^{N}g_n = 1.$$

For a connected network with local coupling, a similar transition to sync takes place for coupling strength $$K > K_c^{(local)} = \frac{2}{\pi\hat{g}\lambda_2},$$

where $\lambda_2$ is the second smallest eigenvalue of the Laplacian matrix derived from connectivity matrix $A=\{a_{mn}\}$.

For an arbitrary connected network, the dynamics may be analyzed using a weighted Laplacian $L_w$ of the graph: $L_w = BWB^T$, where B is the $[n\times\|E\|]$ incidence matrix presenting interconnections of nodes.

Figure 9:
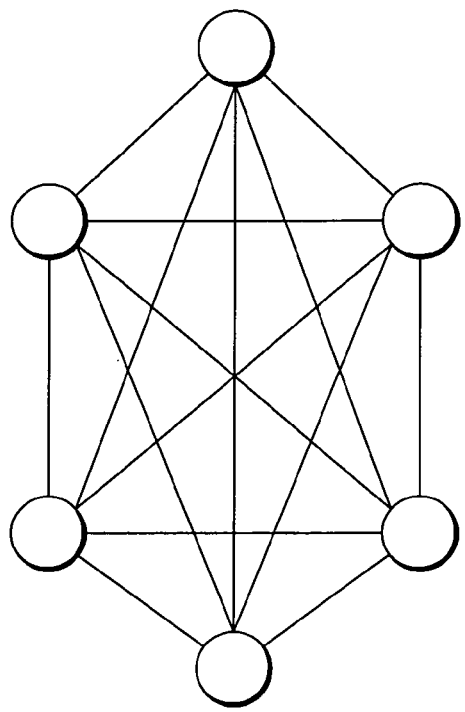
FIG. 9 shows an exemplary globally connected network of N=6 nodes.

FIG. 9 shows an exemplary globally connected network of N=6 nodes.

Figure 10:
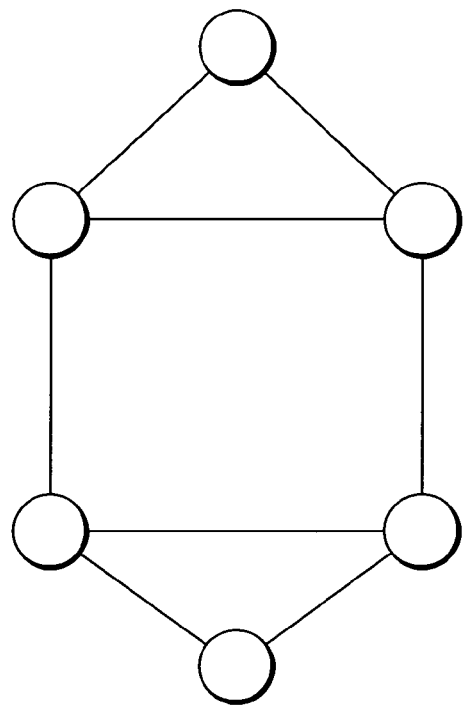
FIG. 10 depicts an exemplary locally connected network.

FIG. 10 depicts an exemplary locally connected network.

For example, for the exemplary network presented in FIG. 10, the Laplacian L is:

$$L = \begin{pmatrix} 3 & -1 & -1 & 0 & 0 & -1 \\ -1 & 2 & -1 & 0 & 0 & 0 \\ -1 & -1 & 3 & 1 & 0 & 0 \\ 0 & 0 & -1 & 3 & -1 & -1 \\ 0 & 0 & 0 & -1 & 2 & -1 \\ -1 & 0 & 0 & -1 & -1 & 3 \end{pmatrix} \text{ and} \quad (5)$$

$(\lambda_1, \lambda_2, \lambda_3, \lambda_4, \lambda_5, \lambda_6) = (0.0, 1.0, 3.0, 3.0, 3.0, 5.0)$ As one may see, for the example (locally coupled) connected network of FIG. 10, the critical coupling strength $K_c^{(global)}/K_c^{(local)}=N//K_c^{(local)}$ is 6 times larger than for the exemplary globally connected network of FIG. 9. In physics (e.g., solid-state devices), a large coupling strength usually forces the system beyond the weak-coupling regime and may result in different physical phenomena with other dynamics. However, in communication systems the corrections in the coupling term of equation (3) are calculated locally and do not create such problems. This means that the results presented above for fully connected networks may be applied to locally connected networks/graphs (as long as they remain connected) with a properly scaled coupling strength, provided that the network parameters are known or upper bounded (e.g., by max Tx power).

General conditions for synchronization in networks with a complex connectivity (e.g., random, small world, free scale networks) may be derived based on their topological properties, for example.

The distributed estimation scheme outlined above has recently attracted attention (see Barbarossa). Unfortunately, the scheme so described cannot be used in practical cognitive radio systems because these schemes assume continuous interactions. In particular, the scheme is based on continuous transmission which is generally impractical, at least from a power consumption point of view (not to mention the resulting interference with other systems). Furthermore, the scheme also assumes full-duplex communication.

In practical systems, full-duplex in transmit (Tx) and receive (Rx) operations, especially at close frequencies, is problematic due to leakage from the transmitter circuitry into the receiver circuitry (Tx power is generally much greater than Rx power). A typical way to solve this problem (and to share the same antenna) is to use a Tx/Rx switch in the context of a half-duplex regime.

However, the use of half-duplex may imply another problem concerning media access protocols. This issue is not even addressed by conventional techniques presented by Barbarossa. Recall that due to interactions, the system dynamics tune phases and frequencies of oscillators but do not control the Tx/Rx switching intervals.

On the other hand, the correction term in equations (1a) and (1b) is actually the mean field from other simultaneously transmitting nodes. This means that the whole system first is to be time synchronized. For example, at the same time, some nodes must have an opportunity to listen while other nodes are transmitting. One exemplary way to achieve this is to put at least a portion of the simultaneously/synchronously transmitting nodes into a listen mode (e.g., randomly or according to a predefined protocol). If a random technique is used, the number of active synchronously transmitting nodes is always less than in the case of continuous transmission. This increases the time to reach a global stable state, but still preserves the convergence.

To distinguish between a convergence of the dynamical system due to pulse (packet) driven coupling and due to (quasi-) continuous phase-coupling, call the former process time synchronization and the latter process a consensus or the distributed estimation.

In one exemplary embodiment, the mobile node comprises a synchronization unit, an estimator/detector unit and a control block. Principles of the proposed exemplary packet synchronization and distributed detector are as described above. Functions of these blocks are coordinated by the control block as follows.

Each node periodically (period T) switches between a local measurement/detection mode (silent mode, duration $T_s$) and a distributed measurement/detection mode (active mode, duration $T_a$). During active mode, each node may be either in a transmitting mode or a listening mode.

During silent mode, each node: (i) performs measurements on the common channel to maintain time synchronization, and (ii) makes a decision (e.g., measures) on parameters of interest (e.g., interference temperature) for distributed estimation/detection. In particular, during silent mode each node: (a) measures the common channel and calculates timing updates for time synchronization; and (b) makes a local decision (or measures parameters of the environment), and calculates (if needed) a local function $g_n(y_k)$ over certain time interval $t_k$.

During active mode, a local state of the n-th node, $x_n(y_k)$, is updated with information from other nodes (e.g., according to equation (1)) and/or mapped onto a physical carrier (e.g., as oscillator frequency/phase or into a data packet, for example, for transmission to other nodes).

In particular, the control block at each node randomly (or according to a certain protocol) sets either the active/transmitting mode or the active/listening mode and keeps this setting during a given active mode.

In case of active/transmitting mode, the local information from the n [[n]]-th node is transmitted as a wave packet during $[\tilde{t}_k, \tilde{t}_k+T_a]$.

In case of active/listening mode, the state of the n-th node is updated (e.g., according to equation (3)) and preserved (e.g., as a VCO parameter) until the next active/transmitting mode.

One exemplary scheme with continuous-time processing (Rx/Tx shaping filters not shown, but may be included) is depicted in FIG. 11.

With regards to decentralized estimation, and as a non-limiting example, for cognitive radio systems the measurements $y_n(n=1, \ldots, N)$ may comprise values for interference temperature at a given frequency band at different locations. In case of distributed control, $y_n$ may present a local decision, a planned action and/or a behavior strategy from a game theory perspective, as non-limiting examples.

Figure 12:
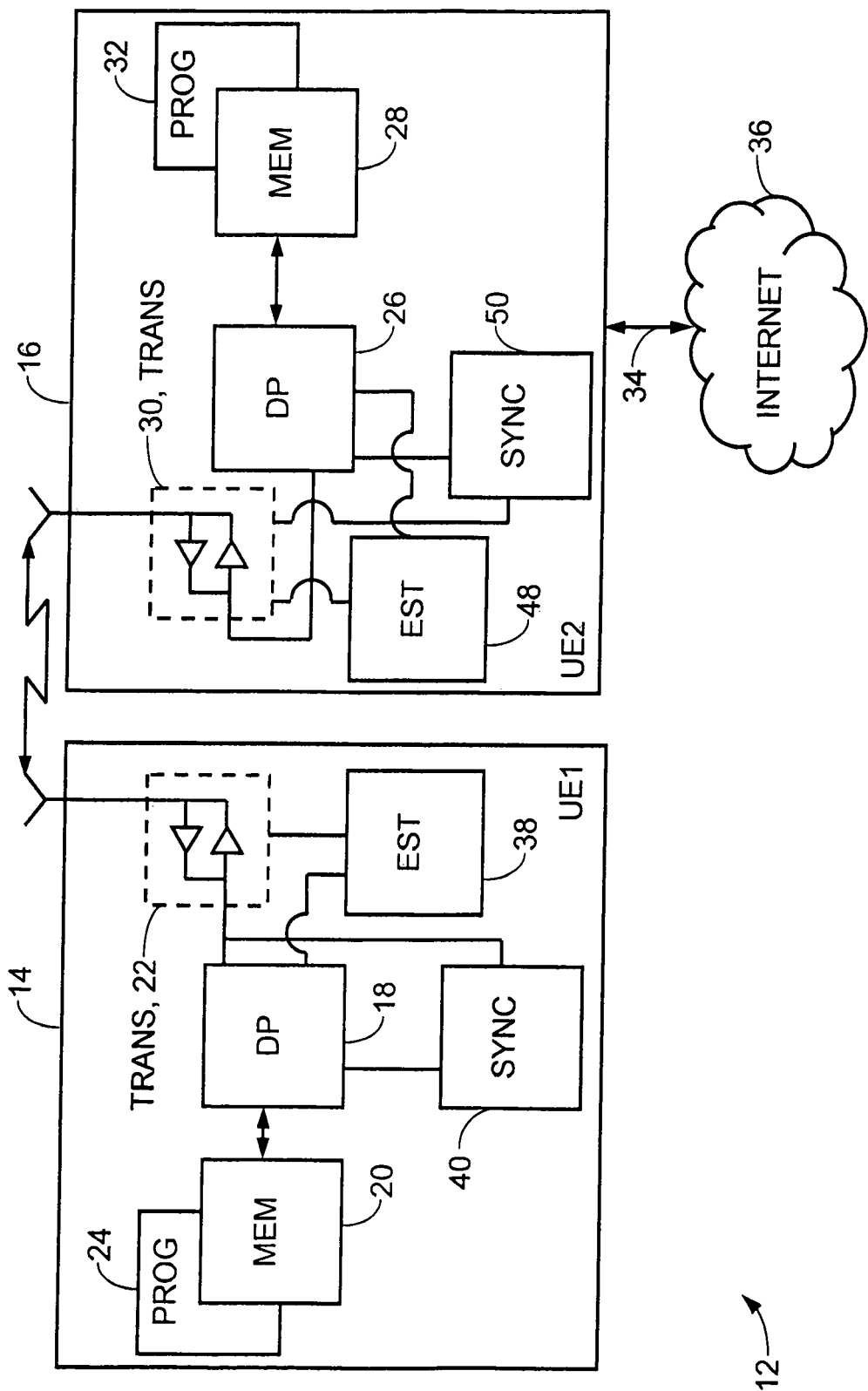
FIG. 12 illustrates a simplified block diagram of exemplary electronic devices that are suitable for use in practicing the exemplary embodiments of this invention.

Reference is made to FIG. 12 for illustrating a simplified block diagram of various electronic devices that are suitable for use in practicing the exemplary embodiments of this invention. In FIG. 12, a decentralized wireless network 12 is adapted for communication amongst at least two user equipments (UE) 14 and UE 16. Each UE 14, 16 includes a data processor (DP) 18, 26, a memory (MEM) 20, 28 coupled to the respective DP 18, 26, and a suitable RF transceiver (TRANS) 22,30 (having a transmitter (TX) and a receiver (RX)) coupled to the respective DP 18, 26. The MEM 20, 28 stores a program (PROG) 24, 32. The TRANS 22, 30 is for bidirectional wireless communications with other UEs. Note that the TRANS 22, 30 has at least one antenna to facilitate communication.

Each UE 14, 16 may also include an estimator (EST) 38, 48 and/or a synchronization block (SYNC) 40, 50 which function in accordance with the corresponding blocks described above with respect to FIG. 11. In such exemplary embodiments, the DP 18, 26, or another control unit or chip, may function as the control block. Zero or more of the UEs (UE2 16 in FIG. 15) may be coupled via a data path 34 to one or more external networks or systems, such as the internet 36, for example.

Although shown in FIG. 12 as separate blocks, in other exemplary embodiments the functions performed by one or more of the ESTs 38, 48 and/or the SYNCs 40, 50 may instead be performed by the respective DP 18, 26. As a non-limiting example, in each UE 14, 16, the functions associated with the respective DP, EST and SYNC, as relating to implementation of the exemplary embodiments of the invention, may instead be performed by a single block, chip or chipset. Furthermore, although shown in FIG. 12 with an exemplary set of connections between the respective blocks, in other exemplary embodiments the ESTs 38, 48, SYNCs 40, 50 and/or DPs 18, 26 may be connected in a different manner, provided the functions and interactions of the various blocks enable the practice of the exemplary embodiments of the invention.

At least one of the PROGs 24, 32 is assumed to include program instructions that, when executed by the associated DP, enable the electronic device to operate in accordance with the exemplary embodiments of this invention, as discussed herein.

In general, the various exemplary embodiments of the UEs 14, 16 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Although shown in FIG. 12 in conjunction with two mobile nodes (UEs 14, 16), the exemplary embodiments of the invention are not limited thereto and may be utilized in conjunction with one or more fixed nodes.

The embodiments of this invention may be implemented by computer software executable by one or more of the DPs 18, 26 of the UEs 14, 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

(1) In an exemplary embodiment of the invention, an apparatus comprising: a transceiver configurable for local exchange of information with at least one other apparatus within a decentralized wireless communication network that at least partially utilizes packet-based communication; and a control unit configurable for making at least one locally available decision or measurement, wherein the control unit is further configurable to cooperate with the at least one other apparatus in making a collective decision at least partially based on at least one local decision or measurement.

An apparatus as above, wherein the transceiver is further configured to transmit the at least one locally available decision or measurement made by the control unit. An apparatus as in the previous, wherein the transceiver is configured to transmit the at least one locally available decision or measurement and to receive information from the at least one other apparatus in accordance with a procedure, wherein the procedure comprises a predefined protocol or random selection of one of transmitting or receiving. An apparatus as in any above, wherein in response to receiving information from the at least one other apparatus, the apparatus is configured to update stored information indicative of a state of the at least one other apparatus. An apparatus as in any above, wherein the measurement made by the control unit comprises a measurement of a control channel common to the apparatus and the at least one other apparatus.

An apparatus as in any above, wherein the measurement made by the control unit comprises a measurement of interference temperature. An apparatus as in any above, wherein the collective decision is indicative of at least one of distributed estimation for the decentralized wireless communication network, distributed control for the decentralized wireless communication network, or substantial time synchronization for the apparatus and the at least one other apparatus. An apparatus as in any above, wherein the collective decision enables the apparatus and the at least one other apparatus to substantially operate in synchronization and further enables the apparatus to participate in distributed estimation or control for packet transmissions within the decentralized wireless communication network. An apparatus as in any above, wherein the decentralized wireless communication network comprises a cognitive radio network. An apparatus as in any above, wherein the apparatus comprises a mobile terminal, a mobile phone, a cellular phone or a portable electronic device.

An apparatus as in any above, wherein the at least one locally available decision comprises at least one of a planned action or a behavior strategy from a game theory perspective. An apparatus as in any above, wherein the measurement made by the control unit comprises a measurement of a control channel common to the decentralized wireless communication network. An apparatus as in any above, wherein the measurement made by the control unit comprises a measurement of interference temperature of at least one frequency band. An apparatus as in any above, wherein the measurement made by the control unit comprises a measurement of interference temperature at a location.

An apparatus as in any above, wherein the measurement made by the control unit comprises a measurement of at least one parameter for a local environment. An apparatus as in any above, wherein the collective decision is indicative of time synchronization for the decentralized wireless communication network. An apparatus as in any above, wherein the collective decision is indicative of a dynamic spectrum allocation for at least the apparatus and the at least one other apparatus. An apparatus as in any above, wherein the collective decision is indicative of a dynamic spectrum allocation for the decentralized wireless communication network.

(2) In another exemplary embodiment of the invention, an apparatus includes: means for local exchange of information with at least one other apparatus within a decentralized wireless communication network that at least partially utilizes packet-based communication; means for making at least one locally available decision or measurement; and means for cooperating with the at least one other apparatus in making a collective decision at least partially based on at least one local decision or measurement.

An apparatus as above, wherein the means for local exchange is further configured for transmitting the at least one locally available decision or measurement made by the control unit. An apparatus as in the previous, wherein the means for local exchange is configured to transmit the at least one locally available decision or measurement and to receive information from the at least one other apparatus in accordance with a procedure, wherein the procedure comprises a predefined protocol or random selection of one of transmitting or receiving. An apparatus as in any above, wherein in response to receiving information from the at least one other apparatus, the apparatus is configured to update stored information indicative of a state of the at least one other apparatus. An apparatus as in any above, wherein the measurement made by the means for making comprises a measurement of a control channel common to the apparatus and the at least one other apparatus.

An apparatus as in any above, wherein the measurement made by the means for making comprises a measurement of interference temperature. An apparatus as in any above, wherein the collective decision is indicative of at least one of distributed estimation for the decentralized wireless communication network, distributed control for the decentralized wireless communication network, or substantial time synchronization for the apparatus and the at least one other apparatus. An apparatus as in any above, wherein the collective decision enables the apparatus and the at least one other apparatus to substantially operate in synchronization and further enables the apparatus to participate in distributed estimation or control for packet transmissions within the decentralized wireless communication network. An apparatus as in any above, wherein the decentralized wireless communication network comprises a cognitive radio network. An apparatus as in any above, wherein the apparatus comprises a mobile terminal, a mobile phone, a cellular phone or a portable electronic device. An apparatus as in any above, wherein the means for local exchange comprises a transceiver and wherein the means for making and the means for cooperating comprise a processor.

An apparatus as in any above, wherein the at least one locally available decision comprises at least one of a planned action or a behavior strategy from a game theory perspective. An apparatus as in any above, wherein the measurement made by the means for making comprises a measurement of a control channel common to the decentralized wireless communication network. An apparatus as in any above, wherein the measurement made by the means for making comprises a measurement of interference temperature of at least one frequency band. An apparatus as in any above, wherein the measurement made by the means for making comprises a measurement of interference temperature at a location.

An apparatus as in any above, wherein the measurement made by the means for making comprises a measurement of at least one parameter for a local environment. An apparatus as in any above, wherein the collective decision is indicative of time synchronization for the decentralized wireless communication network. An apparatus as in any above, wherein the collective decision is indicative of a dynamic spectrum allocation for at least the apparatus and the at least one other apparatus. An apparatus as in any above, wherein the collective decision is indicative of a dynamic spectrum allocation for the decentralized wireless communication network.

(3) In another exemplary embodiment of the invention, and as shown in FIG. 13, a method includes: making at least one locally available decision or measurement by a first apparatus (131); and performing a local exchange of information between the first apparatus and at least one second apparatus within a decentralized wireless communication network that at least partially utilizes packet-based communication, wherein the local exchange of information enables cooperation between the first apparatus and the at least one second apparatus in making a collective decision at least partially based on at least one local decision or measurement (132).

A method as above, wherein performing a local exchange of information comprises transmitting the at least one locally available decision or measurement made by the first apparatus. A method as in any above, wherein performing a local exchange of information comprises transmitting, by the first apparatus, the at least one locally available decision or measurement made by the first apparatus and receiving, by the first apparatus, information from the at least one second apparatus in accordance with a procedure, wherein the procedure comprises a predefined protocol or random selection of one of transmitting or receiving. A method as in any above, further comprising: updating, by the first apparatus and in response to receiving information from the at least one second apparatus, stored information indicative of a state of the at least one second apparatus. A method as in any above, wherein the measurement comprises a measurement of a control channel common to the apparatus and the at least one second apparatus.

A method as in any above, wherein the measurement comprises a measurement of interference temperature. A method as in any above, wherein the collective decision is indicative of at least one of distributed estimation for the decentralized wireless communication network, distributed control for the decentralized wireless communication network, or substantial time synchronization for the first apparatus and the at least one second apparatus. A method as in any above, wherein the collective decision enables the first apparatus and the at least one second apparatus to substantially operate in synchronization and further enables the first apparatus to participate in distributed estimation or control for packet transmissions within the decentralized wireless communication network. A method as in any above, wherein the decentralized wireless communication network comprises a cognitive radio network. A method as in any above, wherein the first apparatus comprises a mobile terminal.

A method as in any above, wherein the at least one locally available decision comprises at least one of a planned action or a behavior strategy from a game theory perspective. A method as in any above, wherein the measurement comprises a measurement of a control channel common to the decentralized wireless communication network. A method as in any above, wherein the measurement comprises a measurement of interference temperature of at least one frequency band. A method as in any above, wherein the measurement comprises a measurement of interference temperature at a location.

A method as in any above, wherein the measurement comprises a measurement of at least one parameter for a local environment. A method as in any above, wherein the collective decision is indicative of time synchronization for the decentralized wireless communication network. A method as in any above, wherein the collective decision is indicative of a dynamic spectrum allocation for at least the apparatus and the at least one other apparatus. A method as in any above, wherein the collective decision is indicative of a dynamic spectrum allocation for the decentralized wireless communication network. A method as in any above, implemented by a computer program. A computer program comprising program instructions stored on a tangible computer-readable medium, the execution of which results in operations comprising the steps of any one of the above methods.

(4) In another exemplary embodiment of the invention, a program storage device readable by a first apparatus, tangibly embodying a program of instructions executable by the first apparatus for performing operations, said operations including: making at least one locally available decision or measurement (131); and performing a local exchange of information between the first apparatus and at least one second apparatus within a decentralized wireless communication network that at least partially utilizes packet-based communication, wherein the local exchange of information enables cooperation between the first apparatus and the at least one second apparatus in making a collective decision at least partially based on at least one local decision or measurement (132).

A program storage device as above, wherein performing a local exchange of information comprises transmitting the at least one locally available decision or measurement made by the first apparatus. A program storage device as in any above, wherein performing a local exchange of information comprises transmitting, by the first apparatus, the at least one locally available decision or measurement made by the first apparatus and receiving, by the first apparatus, information from the at least one second apparatus in accordance with a procedure, wherein the procedure comprises a predefined protocol or random selection of one of transmitting or receiving. A program storage device as in any above, said operations further comprising: updating, by the first apparatus and in response to receiving information from the at least one second apparatus, stored information indicative of a state of the at least one second apparatus. A program storage device as in any above, wherein the measurement comprises a measurement of a control channel common to the apparatus and the at least one second apparatus.

A program storage device as in any above, wherein the measurement comprises a measurement of interference temperature. A program storage device as in any above, wherein the collective decision is indicative of at least one of distributed estimation for the decentralized wireless communication network, distributed control for the decentralized wireless communication network, or substantial time synchronization for the first apparatus and the at least one second apparatus. A program storage device as in any above, wherein the collective decision enables the first apparatus and the at least one second apparatus to substantially operate in synchronization and further enables the first apparatus to participate in distributed estimation or control for packet transmissions within the decentralized wireless communication network. A program storage device as in any above, wherein the decentralized wireless communication network comprises a cognitive radio network. A program storage device as in any above, wherein the first apparatus comprises a mobile terminal.

A program storage device as in any above, wherein the at least one locally available decision comprises at least one of a planned action or a behavior strategy from a game theory perspective. A program storage device as in any above, wherein the measurement comprises a measurement of a control channel common to the decentralized wireless communication network. A program storage device as in any above, wherein the measurement comprises a measurement of interference temperature of at least one frequency band. A program storage device as in any above, wherein the measurement comprises a measurement of interference temperature at a location.

A program storage device as in any above, wherein the measurement comprises a measurement of at least one parameter for a local environment. A program storage device as in any above, wherein the collective decision is indicative of time synchronization for the decentralized wireless communication network. A program storage device as in any above, wherein the collective decision is indicative of a dynamic spectrum allocation for at least the apparatus and the at least one other apparatus. A program storage device as in any above, wherein the collective decision is indicative of a dynamic spectrum allocation for the decentralized wireless communication network.

(5) In another exemplary embodiment of the invention, an apparatus comprising: communication circuitry for local exchange of information with at least one other apparatus within a decentralized wireless communication network that at least partially utilizes packet-based communication; decision circuitry for making at least one locally available decision or measurement; and cooperation circuitry for cooperating with the at least one other apparatus in making a collective decision at least partially based on at least one local decision or measurement.

An apparatus as above, wherein the communication circuitry is further configured for transmitting the at least one locally available decision or measurement made by the control unit. An apparatus as in the previous, wherein the communication circuitry is configured to transmit the at least one locally available decision or measurement and to receive information from the at least one other apparatus in accordance with a procedure, wherein the procedure comprises a predefined protocol or random selection of one of transmitting or receiving. An apparatus as in any above, wherein in response to receiving information from the at least one other apparatus, the apparatus is configured to update stored information indicative of a state of the at least one other apparatus. An apparatus as in any above, wherein the measurement made by the decision circuitry comprises a measurement of a control channel common to the apparatus and the at least one other apparatus.

An apparatus as in any above, wherein the measurement made by the decision circuitry comprises a measurement of interference temperature. An apparatus as in any above, wherein the collective decision is indicative of at least one of distributed estimation for the decentralized wireless communication network, distributed control for the decentralized wireless communication network, or substantial time synchronization for the apparatus and the at least one other apparatus. An apparatus as in any above, wherein the collective decision enables the apparatus and the at least one other apparatus to substantially operate in synchronization and further enables the apparatus to participate in distributed estimation or control for packet transmissions within the decentralized wireless communication network. An apparatus as in any above, wherein the decentralized wireless communication network comprises a cognitive radio network. An apparatus as in any above, wherein the apparatus comprises a mobile terminal, a mobile phone, a cellular phone or a portable electronic device. An apparatus as in any above, wherein the communication circuitry comprises a transceiver and wherein the decision circuitry and the cooperation circuitry comprise a processor. An apparatus as in any above, embodied in one or more chips, chipsets, and/or processors.

An apparatus as in any above, wherein the at least one locally available decision comprises at least one of a planned action or a behavior strategy from a game theory perspective. An apparatus as in any above, wherein the measurement made by the decision circuitry comprises a measurement of a control channel common to the decentralized wireless communication network. An apparatus as in any above, wherein the measurement made by the decision circuitry comprises a measurement of interference temperature of at least one frequency band. An apparatus as in any above, wherein the measurement made by the decision circuitry comprises a measurement of interference temperature at a location.

An apparatus as in any above, wherein the measurement made by the decision circuitry comprises a measurement of at least one parameter for a local environment. An apparatus as in any above, wherein the collective decision is indicative of time synchronization for the decentralized wireless communication network. An apparatus as in any above, wherein the collective decision is indicative of a dynamic spectrum allocation for at least the apparatus and the at least one other apparatus. An apparatus as in any above, wherein the collective decision is indicative of a dynamic spectrum allocation for the decentralized wireless communication network.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be appreciated that the exemplary embodiments of the invention may be utilized in conjunction with many different types of decentralized wireless communication systems, including ones that support an arbitrary topology and half-duplex communication between mobile nodes.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. An apparatus comprising at least one processor; and at least one memory including computer program code, the at least one memory and the computer program code being configured to, with the at least one processor, cause the apparatus at least to perform:
   storing information indicative of a state of the apparatus;
   operating the apparatus in one of a local mode and a distributed mode; and
   at another time, operating the apparatus in the other of the local mode and the distributed mode, where the apparatus comprises a node within a decentralized wireless communication network that at least partially utilizes packet-based communication,
   where operating the apparatus in the local mode comprises measuring a common channel to maintain time synchronization with other nodes in the decentralized wireless communication network and making at least one local decision or measurement regarding a parameter for distributed estimation/detection,
   operating the apparatus in a second mode that is different from the first mode, where operating the apparatus in the distributed mode comprises setting an active/transmitting mode or an active/listening mode for the apparatus and, accordingly, one of transmitting the at least one local decision or measurement to at least one other apparatus or receiving information from the at least one other apparatus,
   where in response to the apparatus receiving the information from the at least one other apparatus, operating the apparatus in the second mode further comprises updating, based on the received information and the at least one local decision or measurement, the stored information indicative of the state of the apparatus, wherein updating the stored information enables cooperation with the at least one other apparatus in making a collective decision at least partially based on the at least one local decision or measurement.

2. The apparatus of claim 1, where the apparatus is configured to periodically switch between operating in the local mode and operating in the distributed mode.

3. The apparatus of claim 1, where operating the apparatus in the distributed mode further comprises communicating with the at least one other apparatus in a half-duplex mode of communication.

4. The apparatus of claim 1, where operating the apparatus in the local mode and operating the apparatus in the distributed mode are performed subsequent to the apparatus achieving time synchronization with the at least one other apparatus.

5. The apparatus of claim 1, where operating the apparatus in the distributed mode comprises one of randomly switching the apparatus between the active/transmitting mode and the active/listening mode and switching the apparatus between the active/transmitting mode and the active/listening mode according to a protocol.

6. The apparatus of claim 1, where the decentralized wireless communication network comprises a cognitive radio network.

7. The apparatus of claim 1, where the apparatus comprises a mobile phone.

8. The apparatus of claim 1, where the information received from the at least one other apparatus comprises at least one other local decision or measurement made by the at least one other apparatus.

9. The apparatus of claim 1, where operating the apparatus in the local mode further comprises calculating a local function over a certain time interval, where the local function is a function of the at least one local decision or measurement.

10. The apparatus of claim 1, where time synchronization comprises convergence of a plurality of nodes within the decentralized wireless communication network due to pulse/packet driven coupling.

11. A method comprising:
storing, by an apparatus, information indicative of a state of the apparatus;
operating the apparatus in one of a local mode and a distributed mode; and
at another time, operating the apparatus in the other of the local mode and the distributed mode, where the apparatus comprises a node within a decentralized wireless communication network that at least partially utilizes packet-based communication,
where operating the apparatus in the local mode comprises measuring a common channel to maintain time synchronization with other nodes in the decentralized wireless communication network and making at least one local decision or measurement regarding a parameter for distributed estimation/detection,
where operating the apparatus in the distributed mode comprises setting an active/transmitting mode or an active/listening mode for the apparatus and, accordingly, one of transmitting the at least one local decision or measurement to at least one other apparatus or receiving information from the at least one other apparatus,
where in response to the apparatus receiving the information from the at least one other apparatus, operating the apparatus in the second mode further comprises updating, based on the received information and the at least one local decision or measurement, the stored information indicative of the state of the apparatus, wherein updating the stored information enables cooperation with the at least one other apparatus in making a collective decision at least partially based on the at least one local decision or measurement.

12. The method of claim 11, where the apparatus is configured to periodically switch between operating in the local mode and operating in the distributed mode.

13. The method of claim 11, where operating the apparatus in the distributed mode further comprises communicating with the at least one other apparatus in a half-duplex mode of communication.

14. The method of claim 11, where operating the apparatus in the local mode and operating the apparatus in the distributed mode are performed subsequent to the apparatus achieving time synchronization with the at least one other apparatus.

15. The method of claim 11, where operating the apparatus in the distributed mode comprises one of randomly switching the apparatus between the active/transmitting mode and the active/listening mode and switching the apparatus between the active/transmitting mode and the active/listening mode according to a protocol.

16. The method of claim 11, where the decentralized wireless communication network comprises a cognitive radio network.

17. The method of claim 11, where the apparatus comprises a mobile phone.

18. The method of claim 11, where the information received from the at least one other apparatus comprises at least one other local decision or measurement made by the at least one other apparatus.

19. The method of claim 11, where operating the apparatus in the local mode further comprises calculating a local function over a certain time interval, where the local function is a function of the at least one local decision or measurement.

20. The method of claim 11, where time synchronization comprises convergence of a plurality of nodes within the decentralized wireless communication network due to pulse/packet driven coupling.

21. A computer program product embodied on a non-transitory medium readable by an apparatus, tangibly embodying a program of instructions executable by the apparatus for performing operations, said operations comprising:
storing information indicative of a state of the apparatus;
operating the apparatus in one of a local mode and a distributed mode; and
at another time, operating the apparatus in the other of the local mode and the distributed mode, where the apparatus comprises a node within a decentralized wireless communication network that at least partially utilizes packet-based communication,
where operating the apparatus in the local mode comprises measuring a common channel to maintain time synchronization with other nodes in the decentralized wireless communication network and making at least one local decision or measurement regarding a parameter for distributed estimation/detection,
where operating the apparatus in the distributed mode comprises setting an active/transmitting mode or an active/listening mode for the apparatus and, accordingly, one of transmitting the at least one local decision or measurement to at least one other apparatus or receiving information from the at least one other apparatus,
where in response to the apparatus receiving the information from the at least one other apparatus, operating the apparatus in the second mode further comprises updating, based on the received information and the at least one local decision or measurement, the stored information indicative of the state of the apparatus, wherein updating the stored information enables cooperation with the at least one other apparatus in making a collective decision at least partially based on the at least one local decision or measurement.

22. The computer program product of claim 21, where the apparatus is configured to periodically switch between operating in the local mode and operating in the distributed mode.

23. The computer program product of claim 21, where operating the apparatus in the distributed mode further comprises communicating with the at least one other apparatus in a half-duplex mode of communication.

24. The computer program product of claim 21, where operating the apparatus in the local mode and operating the apparatus in the distributed mode are performed subsequent to the apparatus achieving time synchronization with the at least one other apparatus.

25. The computer program product of claim 21, where operating the apparatus in the distributed mode comprises one of randomly switching the apparatus between the active/transmitting mode and the active/listening mode and switching the apparatus between the active/transmitting mode and the active/listening mode according to a protocol.

26. The computer program product of claim 21, where the decentralized wireless communication network comprises a cognitive radio network.

27. The computer program product of claim 21, where the apparatus comprises a mobile phone.

28. The computer program product of claim 21, where the information received from the at least one other apparatus comprises at least one other local decision or measurement made by the at least one other apparatus.

29. The computer program product of claim 21, where operating the apparatus in the local mode further comprises calculating a local function over a certain time interval, where the local function is a function of the at least one local decision or measurement.

30. The computer program product of claim 21, where time synchronization comprises convergence of a plurality of nodes within the decentralized wireless communication network due to pulse/packet driven coupling.

* * * * *